United States Patent [19]

Fraser, Jr. et al.

[11] E Re. 29,303

[45] Reissued July 12, 1977

[54] TENNIS BALL INCLUDING NEEDLE PUNCHED FABRIC COVER

[75] Inventors: Redmond Power Fraser, Jr., Greenwich, Conn.; Elbirt A. Woodward, Watch Hill, R.I.

[73] Assignee: GAF Corporation, New York, N.Y.

[21] Appl. No.: 615,839

[22] Filed: Sept. 22, 1975

Related U.S. Patent Documents

Reissue of:

[64] Patent No.: 3,396,970
Issued: Aug. 13, 1968
Appl. No.: 527,706
Filed: Feb. 15, 1966

[51] Int. Cl.[2] ..... A63B 39/06

[52] U.S. Cl. ..... 273/61 R; 428/91; 428/95; 28/107; 428/300

[58] Field of Search ..... 273/61, 58; 428/91, 428/300, 95

[56] References Cited

U.S. PATENT DOCUMENTS

| | | | |
|---|---|---|---|
| 2,958,113 | 11/1960 | Lauterbach | 428/300 |
| 3,065,520 | 11/1962 | Schmidt | 273/61 R X |
| 3,074,144 | 1/1963 | Reed | 428/91 |

FOREIGN PATENT DOCUMENTS

| | | | |
|---|---|---|---|
| 1,006,227 | 9/1965 | United Kingdom | 273/61 |

*Primary Examiner*—George J. Marlo
*Attorney, Agent, or Firm*—Walter C. Kehm; J. Gary Mohr

[57] ABSTRACT

*The invention is directed to a tennis ball which includes a spherical shaped inner-member made of rubber or similar material and filled with compressed air to give it the desired shape and resiliency. An outer cover made of two pieces of non-woven non-napped, needle-punched fabric cut into the form of a figure eight is applied to the inner-member by an adhesive. The needle-punched fabric is formed by a sheet of fibrous material in which the fibers normally extend in a plane substantially parallel with the upper and lower surfaces of the sheet and in which a large number of the fibers extend substantially perpendicular to the upper and lower surfaces of the material which is needle-punched therefrom. As a result, the fibers which extend perpendicular to the upper and lower surfaces interlock with successive layers of the fibers to form a desirable cover layer.*

1 Claim, 5 Drawing Figures

INVENTOR
REDMOND POWER FRASER, JR.
ELBIRT A. WOODWARD
BY
Smythe & Moore
ATTORNEYS

TENNIS BALL INCLUDING NEEDLE PUNCHED FABRIC COVER

Matter enclosed in heavy brackets [ ] appears in the original patent but forms no part of this reissue specification; matter printed in italics indicates the additions made by reissue.

This invention relates to tennis balls or the like and more particularly to a tennis ball having a new and improved outer covering.

It is well known in the tennis art that it is both desirable and necessary for a tennis ball to have a fuzzy or roughened nap or pile-like outer surface to give it the desired aerodynamic and control characteristics. For this purpose, it has been generally customary to make the outer covering from a woven woolen material such as "Melton" which is milled, fulled and steamed, or otherwise treated, to provide a closely felted outer surface having a raised nap. It is also well known, however, that such fuzzy or roughened surface wears down relatively rapidly during use of the ball due to the friction and abrasive action caused by the ball striking the racket, the ground, the net and the like, particularly when the ball has a spin imparted to it as is often the case. In the case of woven or knitted fabrics, furthermore, the longitudinal fiber surfaces are subjected to more and more wear by the frictional and abrasive forces acting on the ball as the nap wears down and are thus caused to break down and structurally weaken the fabric. Various substitutes for the napped woolen covers, such as knitted fabrics, piled fabrics, fabrics woven from a mixture of synthetic and natural fibers, and the like, have been proposed, but all are subject to the deficiencies of a woven or knitted material, or introduce new problems of manufacture or cost.

An object of the present invention is to provide a tennis ball in which the outer cover is neither woven, knitted, nor napped, but which has all of the advantages of a napped or piled covering without the disadvantage of a woven or knitted fabric.

A further object of the invention is to provide a tennis ball having a new and improved outer cover in which a large number of fibers are in an essentially perpendicular position with respect to the plane of the fabric surfaces so as continually to expose cross sectional surfaces of the fibers as wear progresses, which take the brunt of the wear stresses and which provide a uniform fuzz level without the necessity of napping or piling.

Another object of the invention is to provide a tennis ball having an outer cover of the character above described in which an almost endless variety of fiber blends can be utilized, thereby allowing functionality to be the governing factor. Thus, blends of wool and small percentages of reinforcing synthetic fibers are on one end of the scale, combining the resilience of wool with the abrasion resistance of the synthetics, while all-synthetic compositions are on the other end, providing even more resistance to wear.

Still another object of the invention is to provide a tennis ball having an outer cover of the character above described in which a woven, knitted, or otherwise constructed rigid or nonrigid system of yarns can be readily incorporated either as a backing or an insert for the nonwoven, nonknitted, nonnapped material or fabric to provide reinforcement and additional dimensional stability, stretchability, moldability or other physical properties.

In a preferred aspect, the tennis ball of the invention comprises a spherical-shaped inner member made of rubber or similar material and filled with compressed air or the like to give it a desired shape and resiliency, and an outer cover made from two pieces of nonwoven, nonnapped, needle-punched fabric cut in the form of a figure 8 or dumbbell shape, and applied to the outer surface of the inner member by a suitable adhesive. The needle-punched fabric may be composed entirely of natural fibers such as wool, or entirely of synthetic fibers, but is preferably composed of a blend of woolen and synthetic fibers to give it the resilience of wool and the abrasive resistance of synthetics. If increased strength is desired, a woven, knitted or otherwise fabricated yarn system may be incorporated into the fabric by the needle-punching to provide a supporting or reinforcing member and to enhance the physical properties of the cover fabric.

A preferred embodiment of the invention and certain modifications thereof are illustrated in the accompanying drawing in which.

Figure 1:
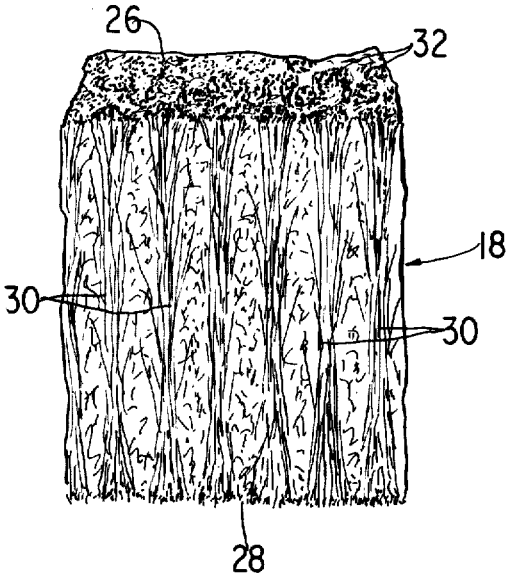
FIG. 1 is a view illustrating an enlarged block or section of the outer fabric cover for the ball.
Figure 2:
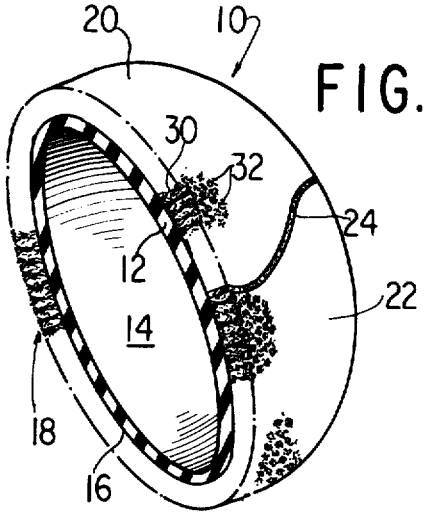
FIG. 2 is a sectional perspective view of a tennis ball made in accordance with the present invention.
Figure 3:
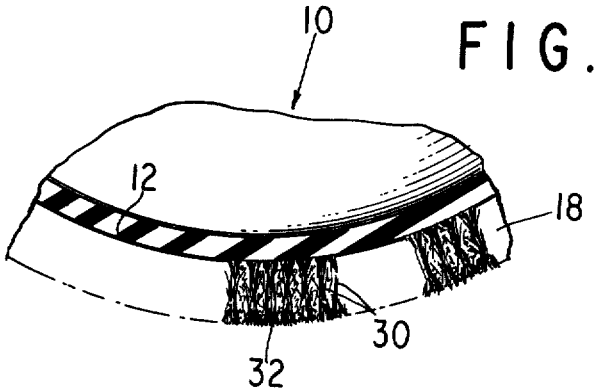
FIG. 3 is a fragmentary sectional view further illustrating the structure of the ball and outer cover.

Referring to the drawing and particularly to FIG. 1, the new and improved tennis ball 10 is shown as comprising an inner spherical or ball-shaped supporting member 12 made of rubber or a similar material and having its hollow interior 14 filled with a compressed gas such as air to give the ball its desired form and resiliency. Stretched around the outer surface 16 of member 12 and fixedly adhered thereto by a heat-cured or other suitable adhesive (not shown) is an outer cover member 18 which may be applied in any desired manner but which, in the illustrated embodiment, is formed from two similar pieces 20 and 22 of fabric cut into a figure 8 or dumbbell shape and joined together at seams 24 when drawn tight around the ball-shaped supporting member 12. To assist in maintaining the cover member tightly stretched around the supporting member 12, the two sections or pieces 20 and 22 are also preferably joined together or united at the seams 24 by a suitable adhesive material.

In accordance with the present invention, cover member 18 comprises a felt-like fabric that has been formed by needle punching instead of being woven, knitted or otherwise fabricated from yarn. A fabric of this general type is disclosed in U.S. Pat. No. 2,958,113 to Lauterbach, and consists, in general, of a sheet or batt of material in which the fibers normally extend in a direction or plane substantially parallel with the upper and lower surfaces thereof, but in which a large number of the fibers are forcibly bent to intersperse and interlock with successive layers of fibers and to extend in a direction generally perpendicular to such surfaces by the repeated insertion and withdrawal of barbed or rasped needles into and out of the fabric material. A section or block of such needle-punched fabric is illustrated in FIG. 1 wherein the fibers of the material are normally oriented to lie in planes substantially parallel with the upper and lower surfaces 26 and 28, respectively, of the cover member 18. Due to the needle-punching action, however, a large number of the fibers have been caused to be bent so as to extend substantially perpendicular to the surfaces 26 and 28 as indicated at 30 in FIG. 1 and also in the other figures. Additionally, the needle-punching technique causes a large number of the fiber ends to project or extend perpendicularly above the surface 26, as indicated at 32, thereby providing a satisfactorily uniform fuzz level without the necessity of any napping operation. During use of the ball, a substantial amount of the abrasive action and wear is taken by the perpendicularly extending fibers which continually present new cross sectional areas of fiber to the wear surface and provide frayed end filaments 32 which replenish the fuzzy or pile like roughened surface on the outer side of cover member 18.

As above noted, the felt-like needle-punched fabric of cover member 18 may be composed entirely of natural fibers such as wool, or entirely of synthetic fibers such as nylon, but is preferably composed of a blend or mixture of both natural and synthetic fibers to provide the resiliency of wool and the abrasion resistance of the synthetics. Certain examples of such blends are hereinafter set forth.

Figure 4:
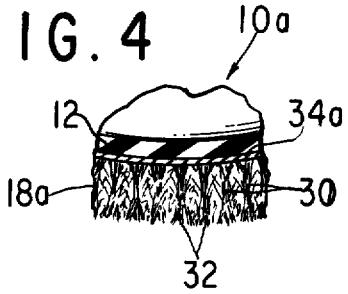
FIG. 4 is a fragmentary section showing a backing or supporting member incorporated in the cover fabric.
Figure 5:
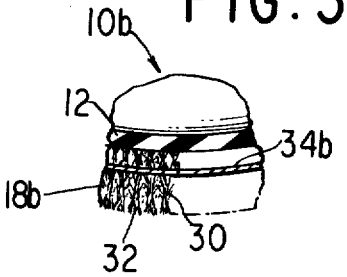
FIG. 5 is a fragmentary section showing a reinforcing or strengthening member incorporated in the body of the cover fabric.

As noted above, a woven or otherwise constructed rigid system of yarns for additional dimensional stability, or a knitted or otherwise constructed non-rigid yarn system for increased stretchability or moldability, may be incorporated in the needle-punched fabric as a backing or reinforcing member. FIG. 4 illustrates a portion of a ball 10A in which such a yarn system or member 34A is incorporated as a backing for the needle-punched cover member 18A. FIG. 5 illustrates a portion of a ball 10B in which such a yarn system or member 34B has been inserted within the needle-punched fabric of a cover member 18B. Preferably, as shown in FIG. 5, member 34B is inserted or incorporated relatively close to the back or inner surface of cover member 18B so that the major portion of the fiber mass is available for wear, upended fibers being liberated continually, as above described, before wear progresses to the member 34B or to the backing 34A of FIG. 4. The backing member 34A of FIG. 4 or the insert 34B of FIG. 5 is readily incorporated in cover members 18A and 18B so as to form a unitary fabric structure by the needle-punching operation which intermeshes the perpendicularly extending fibers of the felted fabric with the woven or knitted yarn system of the backing or insert.

The following are examples of fiber blends which have been found satisfactory for tennis ball covers made in accordance with the present invention:

EXAMPLE 1

A blend of 60% wool, 20% nylon and 20% Fiber 40 Viscose, and having a total weight of 16 ounces per square yard, was needle-punched to provide a felted cover fabric without any backing or insert member.

EXAMPLE 2

A blend of 80% New Zealand wool and 20% nylon, and having a weight of 13.9 ounces per square yard, was needle-punched to a backing of bleached Osnaburg having a weight of 3.9 ounces per square yard to produce a felted cover fabric weighing 17.8 ounces per square yard.

EXAMPLE 3

An insert of Osnaburg cotton scrim weighing 4 ounces per square yard was needle-punched to a back blend of 60% lamb's wool and 40% nylon having a total weight of 3.5 ounces per square yard, and to a face blend comprising 70% New Zealand wool, 10% nylon and 20% lamb's wool for a weight of 11.2 ounces per square yard to produce a felted cover having a weight of 18.7 ounces per square yard.

It will be understood, of course, that the foregoing compositions are for purposes of example only and are not intended to limit the kind, percentage or amount of fibers used for the cover fabric or the type of backing or insert material employed.

It will be evident from the foregoing disclosure that the invention provides a new and improved tennis or the like ball that has all of the advantages and features set forth in the above objects as well as other features and advantages, which is relatively simple and inexpensive to manufacture and which provides a desired fuzzy or roughened outer surface through long periods of usage and wear. Not only is the necessity of napping obviated, but more fiber cross sectional surfaces continue to be exposed as wear progresses. This mechanism significantly alters the frictional and wear behavior of tennis ball coverings.

While preferred embodiments of the invention have been illustrated, it is intended that the invention be limited only by the scope of the appended claims. Also, although the invention is described as relating to a tennis ball, it can be utilized for other playballs requiring similar characteristics and the claims should be so construed.

What is claimed is:

1. A tennis ball comprising a resilient spherical supporting member, a [felt-like] fabric cover member stretched over the outer surface of said supporting member, said fabric *consisting of a sheet of felt material in which the fibers thereof extend in planes substantially parallel with the upper and lower surfaces thereof*, having a large number of fibers [extending] *of said sheet being oriented* substantially perpendicular to the upper and lower surfaces of the [fabric and] *sheet being* needle-punched therefrom [,] *said perpendicularly oriented fibers being interspersed and interlocked with successive parallel layers of the fibers of the sheet, a substantial number of said perpendicularly oriented fibers projecting above said upper surface of said sheet*, and adhesive means adhering said cover member to said supporting surface.

[2. A tennis ball as set forth in claim 1 in which a yarn system member is incorporated in said fabric adjacent the inner surface of the cover member to enhance its physical properties.]

* * * * *